(12) United States Patent
Zhao et al.

(10) Patent No.: US 6,815,529 B2
(45) Date of Patent: Nov. 9, 2004

(54) CATALYST FOR PRODUCING ALIPHATIC POLYCARBONATE AND THE PREPARATION THEREOF

(75) Inventors: Xiaojiang Zhao, Changchu (CN); Xianhong Wang, Changchun (CN); Fosong Wang, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 94 days.

(21) Appl. No.: 09/943,217

(22) Filed: Aug. 29, 2001

(65) Prior Publication Data

US 2002/0082363 A1 Jun. 27, 2002

(30) Foreign Application Priority Data

Dec. 27, 2000 (CN) .................... 00 1 13618 A

(51) Int. Cl.$^7$ .............. C08G 64/34; B01J 31/20; B01J 31/16; B01J 27/20
(52) U.S. Cl. ............ 528/405; 528/371; 528/410; 528/413; 528/414; 528/416; 528/421; 502/102; 502/151; 502/154; 502/156
(58) Field of Search ................ 502/102, 154, 502/156; 528/371, 405, 410, 413, 414, 416, 421

(56) References Cited

U.S. PATENT DOCUMENTS 3,248,415 A * 4/1966 Stevens

FOREIGN PATENT DOCUMENTS

CN   1257885   *   6/2000

OTHER PUBLICATIONS

Tan; Copolymerization of Carbon Dioxide, Propylene Oxide and Cyclohexene Oxide; *Preprints—ACS Division of Petroleum Chemistry* 45(1) pp. 100–103, 2000.*
Tan; Alternating Copolymerization of Carbon Dioxide and Propylene Oxide . . . ; Macromolecules 30 pp. 3147–3150, 1997.*

* cited by examiner

*Primary Examiner*—David J. Buttner
(74) *Attorney, Agent, or Firm*—Knobbe, Martens, Olson & Bear, LLP

(57) ABSTRACT

This invention relates to a catalyst for producing aliphatic polycarbonate, which is composed of a rare-earth coordination compound; an alkyl metal compound; a polyol; and a carbonate. The catalytic efficiency of the catalyst of the present invention is more than $8 \times 10^4$ g polymer/mol RE(RE is rare earth metal). The number average molecular weight of the polymer is higher than 30,000. The degree of carbon dioxide fixation is more than 42 wt % and the content of alternative sequence structure exceeds 97%.

15 Claims, No Drawings

CATALYST FOR PRODUCING ALIPHATIC POLYCARBONATE AND THE PREPARATION THEREOF

CROSS-REFERENCE TO RELATED APPLICATIONS

This application claims priority to Chinese Application Serial Number 00136189.9 filed on Dec. 27, 2000, the disclosure of which is incorporated herein by reference in its entirety.

FIELD OF THE INVENTION

The present invention relates to a catalyst for the preparation of high molecular weight aliphatic polycarbonate and the preparation of the catalyst. The present invention further relates to a method for the preparation of high molecular weight aliphatic polycarbonate by using the catalyst of the present invention.

BACKGROUND OF THE INVENTION

Venting of carbon dioxide to the atmosphere in large amount results in "greenhouse effect" which is detrimental to the environment. Carbon dioxide is an environmental polluting gas, but from another point of view carbon dioxide is an abundant natural resource. One of the main hot spots for research is to utilize carbon dioxide as a raw material for synthesizing polymeric materials. These materials could be used as biodegradable packaging materials, medical materials, adhesives and additives for composites.

It was reported in U.S. Pat. No. 3,585,168, U.S. Pat. No. 3,900,424 and U.S. Pat. No. 3,9563,383 that alternating copolymers (Mn>20,000) of carbon dioxide and epoxy compounds as well as various polyurethane and polyethers were synthesized by using alkyl zinc/compounds containing active hydrogen as the catalysts. In JP 02,575,199 and JP 02,142,824, expensive complex of metal and porphyrin was used as the catalyst. Although this catalyst gave higher catalytic efficiencies ($10^3$–$10^4$ g polymer/mol catalyst), the molecular weights of polymers obtained were relatively low (number average molecular weight (Mn) was approximately 5,000) and the polymerization time was more than 10 days. In Chinese Patent Application No. ZL89100701.6 and ZL91109459.8, anionic coordinated bimetallic catalytic systems were used. The catalytic efficiency was $10^3$–$10^4$ g polymer/mol catalyst. Yet due to the difficulty of removing the supporting materials, polycarbonate thus obtained was hard to be purified. In addition, the molecular weight of the polymer thus obtained still needs to be raised. It was reported in Macromolecules, 24, 5305, 1991; Macromolecules, 30, 3147, 1997; and Polymer Preprint 99-3, 100, 2000 that a rare-earth ternary catalyst system can be used for the synthesis of polycarbonate. The former used rare-earth ester of phosphonic acid as the catalyst which has a lower catalytic efficiency and lower degree of carbon dioxide fixation (<30 wt %). Polycarbonate obtained by this catalyst was a block copolymer. The latter paper described that the percentage of the alternative sequence structure was higher than 95%, but the coordination compound used was expensive and the catalytic efficiency needed to be raised. A comprehensive review on the catalysts and polymerization systems used in the syntheses of polycarbonate was published in J. Polymer Sci.: Part A: Polym. Chem. 37, 1863, 1999. It was pointed out that except for a few zinc salt catalytic systems (polymerization time was 40 hours), most of the processes were polymerization processes involving organic solvents like dioxane, dioxolane, dioxymethane, hexane, benzene, tetrahydrofuran, toluene or a mixture thereof. By using zinc salt of glutaric acid as the catalyst for non-solvent polymerization, it is possible to obtain polycarbonate with high catalytic efficiency. However it needs a polymerization time of 40 hours and also very critical polymerization conditions.

Chinese Patent Application No. 98125654.6 and 98125655.9 described methods for preparing rare-earth complex ternary catalyst and high molecular weight aliphatic polycarbonate.

DETAILED DESCRIPTION OF THE PREFERRED EMBODIMENTS

It is one object of the present invention to provide a catalyst for preparing high molecular weight polycarbonate. The catalyst consists of a rare-earth coordination compound, an alkyl metal compound, a polyol and a cyclic carbonate. The catalyst of the present invention can be used under medium pressure to copolymerize epoxy compound with carbon dioxide in the absence of any solvent.

The catalyst of the present invention comprises
a rare-earth coordination compound with the formula:

$MX_nY_m$ wherein, M is a rare earth element selected from the group consisting of Y, La, Ce, Pr, Nd, Sm, Eu, Gd, Th, Dy, Ho, Er, Tu, Yb, Lu, and a mixture of two or more of the rare earth element, preferably M is Y or Nd; X is a carboxylic acid group or a sulfonic acid group with Ka values above $10^{-3}$, preferably, the carboxylic acid group or sulfonic acid group is selected from the group consisting of trifluoroacetic group, trichloroacetic group, dichloroacetic group, chloroacetic group, o-chlorobenzoic group, α-tartaric acid group, benzene sulfonic acid group, naphthalene sulfonic acid group and a mixture of one or more of them, more preferably, the carboxylic acid group of the rare earth coordination compound is trifluoroacetic group, trichloroacetic group or dichloroacetic group; Y is selected from the group consisting of —Cl, —NO₂, =O, —OH, preferably Y is —Cl or —OH; n and m are independently integers from 0 to 3;

an alkyl metal compound, wherein the metal is zinc, magnesium or aluminum, and the alkyl group is selected from the group consisting of CH₃—, CH₃CH₂—, CH₃CH₂CH₂—, (CH₂)₂CH—, CH₃CH₂CH₂CH₂—, (CH₂)₂CHCH₂—, and CH₃CH(CH₃)CH₂—, preferably, the metal is zinc, and the alkyl group is CH₃CH₂—, CH₃CH₂CH₂—(CH₂)₂CH—, or CH₃CH₂CH₂CH₂—;

a polyol selected from the group consisting of ethylene glycol, diethylene glycol, triethylene glycol, 1,2-propandiol, 1,3-propandiol, glycerin and a mixture thereof, preferably, the polyol is 1,2-propylene glycol, or glycerin; and a carbonate selected from the group consisting of ethylene carbonate, propylene carbonate, cyclohexylene carbonate and a mixture thereof, preferably, the carbonate is propylene carbonate.

It is another object of the present invention to provide a method for preparing the catalyst of the present invention, the method comprising:
sequentially adding
a polyol selected from the group consisting of ethylene glycol, diethylene glycol, triethylene glycol, 1,2-propanediol, 1,3-propanediol, glycerin and a mixture thereof;

a rare-earth coordination compound of the formula $MX_nY_m$, wherein, M is a rare earth element selected from the group consisting of Y, La, Ce, Pr, Nd, Sm, Eu, Gd, Tb, Dy, Ho, Er, Tu, Yb, Lu, and a mixture of two or more of the rare earth element; X is a carboxylic acid group or sulfonic acid group with Ka values above $10^{-3}$, preferably, the carboxylic acid group or sulfonic acid group is selected from the group consisting of trifluoroacetic group, trichloroacetic group, dichloroacetic group, chloroacetic group, o-chlorobenzoic group, α-tartaric acid group, benzene sulfonic acid group, naphthalene sulfonic acid group and a mixture of one or more of them; Y is selected from the group consisting of —Cl, —$NO_2$, =O, —OH; n and m are independently integers from 0 to 3;

and an alkyl metal compound, wherein the metal is zinc, magnesium or aluminum, and the alkyl group is selected from the group consisting of $CH_3$—, $CH_3CH_2$—, $CH_3CH_2CH_2$—, $(CH_2)_2CH$—, $CH_3CH_2CH_2CH_2$—, $(CH_2)_2CHCH_2$—, and $CH_3CH(CH_3)CH_2$—;

to the carbonate selected from the group consisting of ethylene carbonate, propylene carbonate, cyclohexylene carbonate and a mixture thereof;

stirring or grinding the mixture thus obtained;

aging the mixture for 1–24 hours under 0–50 times atmospheric pressure of nitrogen, argon, carbon dioxide or under supercritical condition.

It is a further object of the present invention to provide a method for preparing aliphatic polycarbonate by using the catalyst of the present invention, which comprising adding the catalyst of the present invention and an epoxide into an autoclave;

filling the autoclave with carbon dioxide and maintaining the pressure between 10–40 atmospheres;

allowing copolymerization reaction to proceed at 60–100° C. for 5–24 hours;

adding a HCl/methanol solution, preferably 50% by weight, or an aqueous HCl solution, preferably 5% by weight to terminate the reaction, thus obtaining a polycarbonate.

The polycarbonate thus obtained can be washed with methanol and a white polycarbonate can be obtained finally.

The alkyl metal as a component of the catalyst plays an important role in the obtaining of polycarbonate with high content of alternative sequence structure, and the rare-earth coordination compound has a specific influence on raising the molecular weight of polycarbonate. The addition of cyclic carbonate can promote the polymerization reaction to the formation of polymers, resulting in higher comonomer conversion. The catalytic efficiency of the catalyst of the present invention is more than $8 \times 10^4$ g polymer/mol RE(RE is rare earth metal). The molecular weight of the polymer is higher than 30,000. The degree of carbon dioxide fixation is more than 42 wt % and the content of alternative sequence structure exceeds 97%.

EXAMPLES

Example 1

Aged Neodymium trichloroacetate/diethyl zinc/glycerin (containing 0.00075 mol Neodymium trichloroacetate, 0.015 mol $ZnEt_2$, 0.015 mol glycerin, and 0.150 mol propylene carbonate, $CO_2$ at 20 atmospheric pressure, aged for 12 hrs) was used as the catalyst. The catalyst and 80 ml propylene oxide were put into the autoclave in the absence of oxygen, quickly filling in $CO_2$ and maintaining the pressure at 30 atmospheres. The polymerization was carried out at 70° C. for 10 hrs. The reaction was terminated by addition of 5% HCl/methanol solution and the precipitate was purified by repeated precipitation. Propylene oxide conversion was 69%. The final yield of white polycarbonate was 60.3g($8.04 \times 10^4$g polymer/mol Nd). The result of elemental analysis is: C%: 47.93, H%: 6.01 (the theoretical value for alternative copolymer is C%: 47.06, H%: 5.92). $^1H$ NMR measurement: content of alternative sequence structure is higher than 98%. $M_2$=45,000; the glass transition temperature is 39.10° C.

Example 2

Aged yttrium trifluoroacetate/diethyl zinc/glycerin (containing 0.00010 mol yttrium trifluoroacetate, 0.0015 mol diethylene glycol, 0.015 mol $ZnEt_2$ and 0.300 mol propylene carbonate, $CO_2$ at 20 times atmospheric pressure, aged for 12 hrs) was used as the catalyst. The catalyst and 80 ml propylene oxide were added into an autoclave in the absence of oxygen, quickly filling in $CO_2$ and maintaining the pressure at 10 times atmospheric pressure. The polymerization was carried out at 70° C. for 10 hrs. Polymerization reaction was terminated as in Example 1. The final yield of white polycarbonate was 53.7 g($5.37 \times 10^4$ g polymer/mol Y). The results of elemental analysis and $^1H$ NMR measurements showed the existence of ether linkage in the copolymer, the carbon dioxide unit content in the copolymer was 38.6 wt %. $M_n$=65,300; the glass transition temperature is 33.5° C.

Example 3

Aged neodymium trichloroacetate/di-isobutyl zinc/glycerin (containing 0.0015 mol neodymium trichloroacetate, 0.00015 mol 1,2-propanediol, 0.015 mol $ZnEt_2$, $CO_2$ at 50 times atmospheric pressure, aged for 8 hrs) was used as the catalyst. The catalyst and 80 ml propylene oxide were put into the autoclave in the absence of oxygen, quickly filling in $CO_2$ and maintaining the pressure at 30 times atmospheric pressure. The polymerization was carried out at 60° C. for 12 hrs. Polymerization reaction was terminated as in Example 1. The final yield of white polycarbonate was 69.2 g($4.61 \times 10^4$ g polymer/mol Nd). The results of elemental analysis and $^1H$ NMR measurements were similar to those of Example 1. $M_n$=37,300, the glass transition temperature is 38.0° C.

Example 4

Aged yttrium dichloroacetate/di-isopropyl zinc/glycerin (containing 0.00075 mol yttrium dichloroacetate, 0.00015 mol glycerin, 0.015 mol di-isopropyl zinc and 0.015 mol propylene carbonate, $CO_2$ at 30 times atmospheric pressure, aged for 10 hrs) was used as the catalyst. The catalyst and 80 ml propylene oxide were put into the autoclave in the absence of oxygen, quickly filling in $CO_2$ and maintaining the pressure at 30 times atmospheric pressure. The polymerization was carried out at 80° C. for 12 hrs. Polymerization reaction was terminated as in Example 1. The final yield of white polycarbonate was 63.4 g($8.4 \times 10^4$ g polymer/mol Y). The results of elemental analysis and $^1H$ NMR measurements were similar to those of Example 1. $M_n$=101,000, the glass transition temperature is 39.5° C.

Example 5

Aged yttrium dichloroacetate/di-n-butyl zinc/1,2-propylene glycol (containing 0.00050 mol yttrium dichloroacetate, 0.00015 mol 1,2-propylene glycol, 0.015 mol di-n-butyl zinc and 0.015 mol propenyl carbonate, $CO_2$ at 20 times atmospheric pressure, aged for 12 hrs) was used as the catalyst. The catalyst and 80 ml propylene oxide were put into the autoclave in the absence of oxygen, quickly filling in $CO_2$ and maintaining the pressure at 30 atmospheres. The polymerization was carried out at 70° C. for 10 hrs. Polymerization reaction was terminated as in Example 1. The final yield of white polycarbonate was 33.1 g(6.62× $10^4$ g polymer/mol Y). The results of elemental analysis and $^1H$ NMR measurements were similar to those of Example 1. $M_n$=91,000, the glass transition temperature is 39.5° C.

Example 6

Aged mixed rare earth metal trichloroacetate/di-n-propyl zinc/glycerin (containing 0.00075 mol rare earth metal trichloroacetate, 0.0015 mol glycerin, 0.015 mol di-n-propyl zinc and 0.150 mol propenyl carbonate, $CO_2$ at 20 times atmospheric pressure, aged for 12 hrs) was used as the catalyst. The catalyst and 80 ml propylene oxide were put into the autoclave in the absence of oxygen, quickly filling in $CO_2$ and maintaining the pressure at 30 atmospheres. The polymerization was carried out at 100° C. for 10 hrs. Polymerization reaction was terminated as in Example 1. The final yield of white polycarbonate was 55.8 g(7.44×$10^4$ g polymer/mol RE, RE was rare earth metal). The results of elemental analysis and $^1H$ NMR measurements were similar to those of Example 1. $M_n$=38,300, the glass transition temperature is 37.1° C.

What is claimed is:

1. A catalyst for producing aliphatic polycarbonate, comprising a mixture of:
  (a) a rare-earth coordination compound with the formula:

$MX_nY_m$ 

wherein, M is a rare earth element selected from the group consisting of Y, La, Ce, Pr, Nd, Sm, Eu, Gd, Tb, Dy, Ho, Er, Tu, Yb, Lu, and a mixture of two or more of the rare earth element; X is a carboxylic acid group or sulfonic acid group with Ka values above $10^{-3}$; Y is selected from the group consisting of —Cl, —$NO_2$, =O, —OH; n and m are independently integers from 0 to 3;
  (b) an alkyl metal compound, wherein the metal is zinc, magnesium or aluminum, and the alkyl group is selected from the group consisting of $CH_3$—, $CH_3CH_2$—, $CH_3CH_2CH_2$—, $(CH_2)_2CH$—, $CH_3CH_2CH_2CH_2$—, $(CH_2)_2CHCH_2$—, and $CH_3CH(CH_3)CH_2$—;
  (c) a polyol selected from the group consisting of ethylene glycol, diethylene glycol, triethylene glycol, 1,2-propanediol, 1,3-propanediol, glycerin and a mixture thereof, and
  (d) a carbonate selected from the group consisting of ethylene carbonate, propylene carbonate, cyclohexylene carbonate and a mixture thereof, and obtained by stirring or grinding said mixture, and then aging it for 1–24 hours under 0–50 times atmospheric pressure of nitrogen, argon, carbon dioxide or under super critical condition.

2. The catalyst of claim 1, wherein the carboxylic acid group or sulfonic acid group is selected from the group consisting of trifluoroacettic group, trichloroacetic group, dichloroacetic group, chloroacetic group, o-chlorobenzoic group, α-tartaric acid group, benzene sulfonic acid group, naphthalene sulfonic acid group and a mixture of one or more of them.

3. The catalyst of claim 1, wherein the rare earth metal element is yttrium or neodymium.

4. The catalyst of claim 1, wherein the carboxylic acid group of the rare earth coordination compound is trifluoroacetic group, trichloroacetic group or dichloroacetic group.

5. The catalyst of claim 1, wherein Y is —Cl or —OH.

6. The catalyst of claim 1, wherein the metal alkyl metal is zinc, and alkyl group is $CH_3CH_2$—, $CH_3CH_2CH_2$— $(CH_2)_2CH$—, or $CH_3CH_2\,CH_2CH_2$—.

7. The catalyst of claim 1, wherein the polyol is 1,2-propylene glycol, or glycerin.

8. The catalyst of claim 1, wherein said carbonate is propylene carbonate.

9. A method for preparing a catalyst for producing aliphatic polycarbonate, comprising the steps of:
  (a) sequentially adding
    a polyol selected from the group consisting of ethylene glycol, diethylene glycol, triethylene glycol, 1,2-propanediol, 1,3-propanediol, glycerin and a mixture thereof;
    a rare-earth coordination compound of the formula $MX_nY_m$, wherein, M is a rare earth element selected from the group consisting of Y, La, Ce, Pr, Nd, Sm, Eu, Gd, Tb, Dy, Ho, Er, Tu, Yb, Lu, and a mixture of two or more of the rare earth element; X is a carboxylic acid group or sulfonic acid group with Ka values above $10^{-3}$; Y is selected from the group consisting of —Cl, —$NO_2$, =O, —OH; n and m are independently integers from 0 to 3;
    and an alkyl metal compound, wherein the metal is zinc, magnesium or aluminum, and the alkyl group is selected from the group consisting of $CH_3$—, $CH_3CH_2$—, $CH_3CH_2CH_2$—, $(CH_2)_2CH$—, $CH_3CH_2CH_2CH_2$—, and $CH_3CH(CH_3)CH_2$—;
  to a carbonate selected from the group consisting of ethylene carbonate, propylene carbonate, cyclohexylene carbonate and a mixture thereof;
  (b) stirring or grinding a mixture thus obtained;
  (c) aging the mixture for 1–24 hours under 0–50 times atmospheric pressure of nitrogen, argon, carbon dioxide or under supercritical condition.

10. The method of claim 9, wherein the carboxylic acid group or sulfonic acid group of step (a) is selected from the group consisting of trifluoroacetic group, trichloroacetic group, dichloroacetic group, chloroacetic group, o-chlorobenzoic group, α-tartaric acid group, benzene sulfonic acid group, naphthalene sulfonic acid group and a mixture of one or more of them.

11. The method of claim 9, wherein the mixture in step (c) is aged under the $CO_2$ atmosphere.

12. A method for preparing the aliphatic polycarbonate according to claim 9 further comprising the steps of:
  (d) adding a catalyst prepared according to steps (a)–(c) of claim 9 and an epoxide into an autoclave;
  (e) filling the autoclave with carbon dioxide and maintaining the pressure between 10–40 atmospheres;
  (f) allowing copolymerization reaction to proceed at 60–100° C. for 5–24 hours; and
  (g) adding a HCl/methanol solution or an aqueous HCl solution to terminate the reaction, thus obtaining the polycarbonate.

13. The method of claim 12, wherein the process is carried out in the absence of solvent.

14. The method of claim 12, wherein the HCl/methanol solution is about 50% by weight.

15. The method of claim 12, wherein the aqueous HCl solution is about 5% by weight.

* * * * *